Patented Nov. 10, 1942

2,301,890

UNITED STATES PATENT OFFICE 2,301,890

PROCESS FOR THE MANUFACTURE OF 2-ALKYL-3-PHYTYL-1,4-NAPHTHOQUINONES

John Lee, Nutley, N. J.

No Drawing. Application November 3, 1939,
Serial No. 302,775

9 Claims. (Cl. 260—396)

This invention has for its object the production of 2-alkyl-3-phytyl-1,4-naphthoquinones of the structure

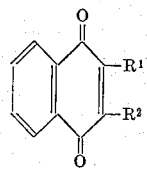

where $R^1$ is a lower alkyl group and $R^2$ is a phytyl group. These products have valuable properties, having powerful anti-hemorrhagic activity when administered to chicks raised on a vitamin $K_1$-deficient diet. The substances are useful therapeutically in diseases such as obstructive jaundice and afflictions in which the prothrombin level of the blood is lowered.

For the purpose of carrying out the invention, phytyl halides are reacted with 2-alkyl-1,4-naphthohydroquinones in a solvent in the presence of an acid-binding agent. The latter component is necessary, since in the presence of acids the reaction proceeds with a considerable production of naphthotocopherols, due to cyclization of the phytyl residue, and the said naphthotocopherols have no considerable anti-hemorrhagic activity nor any utility as intermediates for manufacture of vitamin $K_1$. Preferably I employ as acid-binding agent anhydrous potassium carbonate, although other anhydrous salts with an alkaline reaction, as for example, anhydrous sodium acetate, sodium carbonate or sodium bicarbonate can be used. As a solvent for the 2-alkyl-1,4-naphthohydroquinone, indifferent media such as acetone, dioxane and benzol can be used. The 2-alkyl-3-phytyl hydroquinone so obtained can be oxidized by means of oxygen or air, organic or inorganic peroxides, silver oxide, ferric chloride and the like, to the corresponding quinones.

That the 2-alkyl-3-phytyl naphthohydroquinones should be obtained directly under the reaction conditions employed is surprising. It is well known that under such conditions allylic ethers are usually formed. Since the phytyl group can be considered as a $\gamma,\gamma$-substituted allylic group, it was to be expected that the product isolated should have been 1-hydroxy-2-alkyl-4-phytoxy naphthalene (cf. Hurd et al., J. Am. Chem. Soc. 52, 1702, 1930, Claisen, Ann. der Chemie 418, 78–9). When allylic ethers are formed, as is known in the case of phenyl allyl ether and hydroxy-phenyl allyl ethers, it is necessary to heat to a temperature in the neighborhood of 200° in order to effect so-called Claisen re-arrangement of the phytyl group to the ortho position. In this invention the phytyl group is introduced into the 3-position without any heating other than that occurring at the temperature of the reaction mixture, which is around 60–70° C. That the phytyl group is introduced into the 3-position is shown by the fact that the quinone obtained by oxidizing the reaction product gives no reaction for a free 3-position such as described by Craven, J. Chem. Soc. 1931, 1605.

The 3-alkyl-1,4-naphthohydroquinones can be prepared by directly hydrogenating the corresponding quinone in the solvent to be employed for the reaction, or a solid hydroquinone can be intrduced into the reaction solvent in the ordinary manner.

It is usually preferable not to effect any extensive purification of the 2-alkyl-3-phytyl-1,4-naphthohydroquinone, since the purification is advantageously done after this intermediate has been oxidized to the corresponding quinone. Unreacted 2-alkyl-1,4-naphthohydroquinone can be removed by treating an ether solution of the reaction product with a dilute sodium hydroxide solution containing a small amount of reducing agent such as sodium hydrosulfite, or hydroxylamine. This leaves in solution a substantially pure 2-alkyl-3-phytyl-1,4-naphthohydroquinone which can then be oxidized by shaking in air or oxygen, shaking with silver oxide or with any of the other mild oxidizing agents mentioned. The quinone so obtained can be purified by vacuum distillation or chromatography, or both, one process followed by the other, irrespective of the order. The vacuum distillation in a high vacuum in the neighborhood of less than $10^{-3}$ mm. is desirable, and for chromatography calcium sulfate or basic zinc carbonate form suitable materials.

The following examples illustrate the invention without limiting it thereto:

Example 1

0.889 g. of 2-ethyl-1,4-naphthoquinone is hydrogenated in the presence of palladium in 15 cc. of acetone. In a few minutes the theoretical amount of hydrogen corresponding to 1 molecule of hydrogen is taken up when the solution is filtered under hydrogen into a three-necked flask and 2.3 g. of phytyl bromide in 5 cc. of acetone added. 1 g. of anhydrous potassium carbonate is heated and the mixture, under reflux, with stirring and anhydrous conditions, is heated at 60–70° for 36 hours. The reaction product is decanted from the salts into three volumes of water, extracted with ether, the ether solution shaken vigorously with air for several hours. This latter and subsequent operations are performed in subdued light. After removal of the ether the product is fractionated at $10^{-4}$ mm. and the fraction coming off above 100° and below 200° separated. This material represents substantially pure 2-ethyl-3-phytyl-1,4-naphthoquinone. 20 mg. in 2 cc. of alcohol+one drop of ethyl cyanoacetate+2 cc. of alcoholic ammonia give no blue color characteristic of naphthoquinones with the free 3-position. The Karrer-Dam reaction is given with sodium methylate solution.

Example 2

1.72 g. of 2-methyl-1,4-naphthoquinone in 35 cc. of acetone is hydrogenated in the presence of palladium. After the theoretical absorption of hydrogen the solution is filtered in the absence of oxygen into a reaction vessel. One gram of anhydrous potassium carbonate is added and 3.6 g. of phytyl bromide in 10 cc. of acetone dropped in with stirring under reflux and anhydrous conditions. Dry carbon dioxide is passed through the reaction vessel continuously during the reaction. After removal of a portion of the acetone the remainder is decanted into water, extracted with ether and the ether solution in turn extracted with 1 to 2% NaOH solution containing about 2.5% sodium hydrosulfite. This removes the small portion of unreacted 2-methyl-1,4-naphthohydroquinone. The remaining operations are performed in subdued artificial light. This solution after drying over sodium sulfate is shaken with double the theoretical amount of silver oxide and some sodium sulfate for two hours in a shaking machine. After filtration and removal of the ether, the reaction product is distilled at $10^{-4}$ mm. and a portion volatile at 100-200° C., a yellowish oil to the extent of 0.9 g. is obtained. This material on chromatographing twice on basic zinc carbonate from petroleum ether solution gives a product active at 2 gamma in vitamin $K_1$-depleted chicks and having analysis of C: 82.76%, H: 10.25%. The theoretical requirement for $C_{31}H_{46}O_2$ is C: 82.60%, H: 10.29%. The substance is 2-methyl-3-phytyl-1,4-naphthoquinone. 20 mg. in 2 cc. of alcohol+one drop of ethyl cyanoacetate+2 cc. of alcoholic ammonia give no blue color characteristic of naphthoquinones with the free three-position. The Karrer-Dam reaction for vitamin K is given with sodium methylate solution.

I claim:

1. In a process for the manufacture of a 2-lower alkyl-3-phytyl-1,4-naphthoquinone, the step which comprises reacting a phytyl halide with a 2-lower alkyl-1,4-naphthohydroquinone in the presence of an acid binding agent selected from the class of alkaline salts of weak acids, in an inert solvent for the hydroquinone.

2. In a process for the manufacture of a 2-lower alkyl-3-phytyl-1,4-naphthoquinone, the step which comprises reacting a phytyl halide with a 2-lower alkyl-1,4-naphthohydroquinone in the presence of anhydrous potassium carbonate, in an inert solvent for the hydroquinone.

3. In a process for the manufacture of a 2-lower alkyl-3-phytyl-1,4-naphthoquinone, the step which comprises reacting phytyl bromide with a 2-lower alkyl-1,4-naphthohydroquinone in the presence of an acid binding agent selected from the class of alkaline salts of weak acids, in an inert solvent for the hydroquinone.

4. In a process for the manufacture of 2-methyl-3-phytyl-1,4-naphthoquinone, the step which comprises reacting phytyl bromide with 2-methyl-3-phytyl-1,4-naphthohydroquinone in the presence of anhydrous potassium carbonate, in an inert solvent for the hydroquinone.

5. In a process for the manufacture of 2-methyl-3-phytyl-1,4-naphthoquinone, the step which comprises reacting phytyl bromide with 2-methyl-1,4-naphthohydroquinone in the presence of anhydrous potassium carbonate, in acetone.

6. In a process for the manufacture of 2-ethyl-3-phytyl-1,4-naphthoquinone, the step which comprises reacting phytyl bromide with 2-ethyl-1,4-naphthohydroquinone in the presence of anhydrous potassium carbonate, in acetone.

7. In a process for the manufacture of 2-methyl-3-phytyl-1,4-naphthoquinone, the step which comprises reacting phytyl bromide with 2-methyl-1,4-naphthohydroquinine in the presence of anhydrous potassium carbonate, in dioxane.

8. The process which comprises condensing a 2-(lower alkyl)-1,4-naphthohydroquinone with a phytyl halide in the presence of an anhydrous alkali metal carbonate.

9. The process which comprises condensing a 2-(lower alkyl)-1,4-naphthohydroquinone with a phytyl halide in the presence of an anhydrous alkali metal carbonate, and treating the resulting condensation product with a weak oxidizing agent.

JOHN LEE.